(12) United States Patent
Cordell

(10) Patent No.: US 6,274,520 B1
(45) Date of Patent: Aug. 14, 2001

(54) WATERPROOF FABRIC

(76) Inventor: Katherine R. Cordell, 100 Margaret La., East Ridge, TN (US) 37412

( * ) Notice: Subject to any disclaimer, the term of this patent is extended or adjusted under 35 U.S.C. 154(b) by 0 days.

(21) Appl. No.: 09/124,527

(22) Filed: Jul. 29, 1998

(51) Int. Cl.[7] ................................................. B32B 27/12
(52) U.S. Cl. ........................ 442/381; 442/388; 442/392; 442/394; 442/395; 5/484
(58) Field of Search ............................... 5/484; 442/394, 442/395, 402, 381, 388, 392

(56) References Cited

U.S. PATENT DOCUMENTS

| | | |
|---|---|---|
| 4,525,409 | 6/1985 | Elesh . |
| 4,632,860 | 12/1986 | D'Antonio et al. . |
| 4,772,281 * | 9/1988 | Armstead .............................. 604/358 |
| 5,283,112 | 2/1994 | Krishnan . |
| 5,306,536 | 4/1994 | Moretz et al. . |
| 5,391,418 * | 2/1995 | Strongwater ......................... 428/171 |
| 5,514,459 | 5/1996 | Blauer et al. . |
| 5,527,600 | 6/1996 | Frankosky et al. . |
| 5,565,265 | 10/1996 | Rubin et al. . |
| 5,631,074 | 5/1997 | Herlihy, Jr. . |
| 5,677,028 * | 10/1997 | Ravella ................................ 428/102 |
| 5,685,247 | 11/1997 | Hösselbarth . |

FOREIGN PATENT DOCUMENTS

| | | |
|---|---|---|
| 0541206B1 | 10/1999 | (EP) . |
| 1339859 | 12/1973 | (GB) . |
| WO 80/01031 | 5/1980 | (WO) . |
| 9729909 | 8/1997 | (WO) . |

OTHER PUBLICATIONS

EP 0 899 090 (Abstract only).

* cited by examiner

Primary Examiner—Elizabeth M. Cole
(74) Attorney, Agent, or Firm—Dority & Manning

(57) ABSTRACT

A waterproof fabric sheet for a baby crib, a bassinet, a bed for a health care facility or the like. The fabric sheet is a five-layer laminated waterproof cloth, light in weight, absorbent, breathable, optionally antimicrobial, and washable. The first top layer comprises a material made from polyester fibers and/or cotton fibers. The second layer is a needle punch soaker or a high loft batting soaker made from rayon fibers, polyester fibers and/or cotton fibers being needle punched into a nonwoven polyester or polypropylene scrim material or high loft batting. The third layer comprises a sheet material of polyester and/or acrylic. The fourth layer can be either identical to the second layer or without soaker properties. The fifth layer comprises either polyester, nylon or acrylic material. The second and/or the fourth layers optionally include antimicrobial fibers. The layers are laminated by ultrasonic energy bonding. If the first layer contains greater than 40% cotton fibers, the layer is bonded to the second layer with a water-based urethane glue.

19 Claims, 1 Drawing Sheet

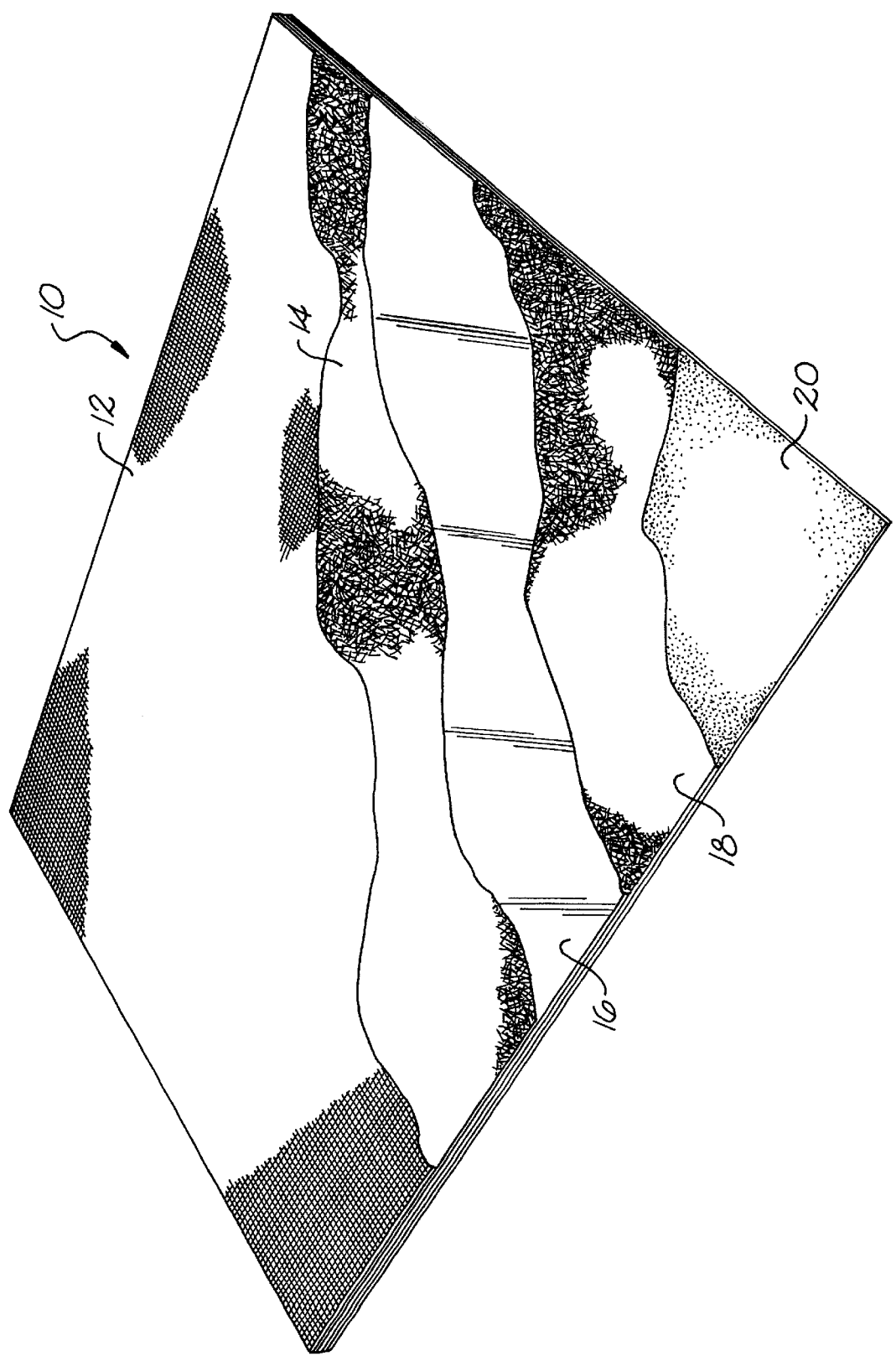

WATERPROOF FABRIC

BACKGROUND OF THE INVENTION

1. Field of the Invention

The present invention relates generally to an improved waterproof fabric useful for bed sheet coverings for a bassinet, a baby crib or an institutional bed. Specifically, the present invention is a four- or five-layered waterproof cloth, light in weight, breathable, washable, optionally antimicrobial, and an aid to prevent possible suffocation of infants.

2. Description of the Related Art

The related art of interest describes various waterproof fabrics for outdoor use. None of the related art addresses the problem of the possible danger of suffocation of infants due to smothering caused by a wet non-breathable bed covering. The related art will be discussed according to perceived relevance to the present invention.

U.S. Pat. No. 5,283,112 issued on Feb. 1, 1994, to Sundaram Krishnan describes the making of waterproof breathable fabric laminates from a polyurethane membrane bonded between woven or nonwoven nylon fabric layers and the products useful for tenting and rainwear. The waterproof polyurethane added product is distinguishable for its emphasis on waterproofing which would not be suitable for a mattress cover as in the present invention.

U.S. Pat. No. 5,527,600 issued on Jun. 18, 1996, to Michael S. Frankosky et al. describes a bonded polyester fiberfill batting with a sealed outer surface by coating with an acrylic resin. The batting is useful for filling pillows, cushions, bedding materials, and in apparel. The batting is distinguishable for its non-laminated structure.

U.S. Pat. No. 5,565,265 issued on Oct. 15, 1996, to Craig A. Rubin et al. describes a liquid and stain resistant antimicrobial fabric made by repeatedly coating a polyester fabric in separate steps with an aqueous composition containing an acrylic copolymer, a fluorochemical and a biocide/mildewcide. The antimicrobial agents disclosed are hereby incorporated by reference. The antimicrobial fabric is distinguishable for its limitation to a single layer.

U.S. Pat. No. 4,525,409 issued on Jun. 25, 1985, to James N. Elesh describes a tightly woven nylon or polyester treated fabric for producing bedding fabrics. The tightly woven taffeta or ripstop weave cloth is coated with a urethane water repellant, a bacteriostatic and fungistatic agent, a fire retardant, and an anti-static agent. The antimicrobial compositions are incorporated by reference. The fabric is distinguishable by the addition of a plurality of agents to the single layer of the tightly woven fabric.

U.S. Pat. No. 4,632,860 issued on Dec. 30, 1986, to John P. D'Antonio et al. describes a waterproof, moisture-breathable, non-macerating, and hypoallergenic fabric by coating a substrate layer containing natural or synthetic fibers with a basecoat of an acrylic polymer and pigment, and a topcoat of either polyether urethane or silicone latex. The fabric is distinguishable for being a single coated layer.

U.S. Pat. No. 5,631,074 issued on May 20, 1997, to Daniel J. Herlihy, Jr. describes a two- or three-layer waterproof breathable fabric for outdoor athletic apparel comprising a shell fabric having a blend of polypropylene filaments and spandex fibers, a waterproof membrane of a copolyether ester laminated to the shell fabric, and optionally, a crepe or mesh lining. A silicone coating may be applied on the shell fabric. The fabric is distinguishable for its waterproofing elastic quality used for a surfer dry suit.

U.S. Pat. No. 5,306,536 issued on Apr. 6, 1994, to Herbert L. Moretz et al. describes a multi-layer moisture management fabric comprising four layers for making undergarments for incontinent people. The shell fabric is conventional undergarment material, the second layer is a thick hydrophilic storage layer of nylon fibers, the third layer is a thin nylon transport layer, and the fourth innermost layer is a knitted or woven hydrophobic polyester layer. The third and fourth layers can be combined. The fabric is distinguishable for its lack of cohesiveness between layers as required in the present invention.

U.S. Pat. No. 5,514,459 issued on May 7, 1996, to Stephen J. Blauer et al. describes a waterproof breathable lining for outerwear comprising a shell fabric of a plain weave of nylon, acrylic or polyester which is printed with a pattern of a terpolymer containing 12–30% urethane, 1% silicone and the remainder being acrylic. The terpolymer pattern is impregnated with a fluorocarbon release agent. The lining includes an intermediate outer synthetic polymer membrane (polyurethane, polyester ether and/or polytetrafluoroethylene), an inner synthetic polymer fabric (nylon or polyester weave or knit), and optionally, an outer synthetic polymer fabric (nylon or polyester weave or knit). The four- or five-layer shell fabric and lining composition does not contain any batting as required in the present invention.

P.C.T. Patent Application No. WO 80/01031 published on May 15, 1980, for Frankosky describes a fiberfill blend for thermal insulation in garments comprising 70–90% crimped polyester staple fiber (polyethylene terephthalate) and 10–30% crimped staple binder fiber (ethylene terephthalate/ethylene isophthalate copolyester with 25–75 wt. % slickened with a cured polysiloxane. The fiberfill blend is distinguishable for its emphasis on thermal quality rather than waterproofing.

None of the above inventions and patents, taken either singularly or in combination, is seen to describe the present invention as claimed. Thus, a waterproof fabric which is light in weight, breathable and multi-ply is desired for wicking away body fluids from an infant while lying on a mattress to prevent the possible danger of smothering when facing a wet and air impermeable sheet.

SUMMARY OF THE INVENTION

The present invention relates to an improved waterproof fabric useful for bed sheet coverings for a bassinet, a baby crib or an institutional bed. The present invention is a four- or five-layered waterproof cloth, light in weight, breathable, optionally antimicrobial, and washable.

Accordingly, it is a principal object of the invention to provide a waterproof fabric consisting of four or five laminated layers.

It is another object of the invention to provide a waterproof fabric comprising a top layer of a material selected from the group consisting of polyester fibers, cotton fibers and mixtures thereof.

It is a further object of the invention to provide a waterproof fabric with a second contiguous layer which is either a needle punch soaker or a high loft batting soaker comprising a material selected from the group consisting of rayon fibers, cotton fibers, polyester fibers, and mixtures thereof, the fibers being needle punched into a nonwoven polyester or polypropylene scrim or batting material.

It is yet another object of the invention to provide a waterproof fabric with a third contiguous layer comprising a sheet material selected from the group consisting of polyester and acrylic.

Yet a further object of the invention is to provide a waterproof fabric with a fourth contiguous layer of either a batting or a needle punch material.

Still another object of the invention is to provide a waterproof fabric with a fifth and bottom layer of a fabric material selected from the group consisting of polyester, nylon and acrylic.

Yet another object of the invention is to provide a waterproof fabric with four layers wherein the fourth layer is a combination of either a batting or a needle punch material with a fabric selected from the group consisting of polyester, nylon and acrylic.

Still another object of the invention is to provide a waterproof and optionally containing an anti-microbial fabric layer suitable for a sheet for either a baby crib, bassinet or an institutional mattress.

It is an object of the invention to provide improved elements and arrangements thereof for the purposes described which is inexpensive, dependable and fully effective in accomplishing its intended purposes.

These and other objects of the present invention will become readily apparent upon further review of the following specification and the drawing.

BRIEF DESCRIPTION OF THE DRAWINGS

The sole FIGURE is a perspective view of a waterproof fabric sheet with one corner showing the five layers separated according to the present invention.

DETAILED DESCRIPTION OF THE PREFERRED EMBODIMENTS

The present invention provides a multi-layered, optionally anti-microbial and waterproof fabric 10 depicted in the FIG. for use preferably as a sheet for a baby crib or an institutional mattress. The fabric 10 must have the intrinsic property of wicking away and absorbing any body fluids deposited by an infant lying on or inadvertently covering one's mouth with the wet sheet covering.

The waterproof five-ply fabric composition comprises a first top layer 12 of a sheet fabric (broadcloth) made of polyester fibers, cotton fibers and blends thereof. The layer 12 can be woven or knit.

The second layer 14 contiguous to the first layer 12 is a needle punch soaker or a high loft batting soaker made from rayon fibers, cotton fibers, polyester fibers, and mixtures thereof. These fibers are punched either into either a nonwoven polyester or polypropylene scrim or a high loft bonded batting bonded with either an acrylic resin or a polyvinyl acetate resin.

The third layer 16 contiguous to the second layer 14 can be either polyester (preferred) or an acrylic material which is a breathable film having the following physical properties measured by the American Standard for Testing Materials (ASTM) for a polyester film.

Basis weight: 25 gm/m$^2$

Machine direction tensile strength: ultimate elongation, 230 Newtons/meter (N/m); 25% elongation, 100 N/m; and 10% elongation, 40 N/m; ASTM D882.

Cross direction tensile strength: ultimate elongation, 140 N/m; 25% elongation, 70 N/m; and 10% elongation, 40 N/m; ASTM 882.

Machine direction unscotched Elmendorf tear: 220 gm; ASTM 1922.

F50 dart impact: 150 gm; ASTM D1709.

Coefficient of friction (Index): 0.7–0.8; ASTM 1894.

Moisture vapor transmission rate: 1500–2000 gm/m$^2$/24 hr; ASTM E96-B.

Light transmittance: 42%; ASTM D1003-D61

The third layer 16 is a basic waterproof, breathable or non-breathable layer in the multi-layered fabric.

The fourth layer 18 contiguous to the third layer 16 can be identical in composition to the second layer 14. Alternatively, rayon, cotton and absorbent fibers are deemed unnecessary as soaker material is not required for this layer.

The fifth layer 20 contiguous to the fourth layer 18 can be either a polyester, nylon or an acrylic material.

The first layer 12 if containing more than 40% cotton must be laminated to the second layer 14 by a water-based urethane glue film 22. The layers 14, 16, 18, and 20 are laminated to each other quickly by ultrasonic energy to form an integral waterproof, breathable fabric as a first process step. Subsequently, the first layer 12 when containing more than 40% natural fibers such as cotton must be laminated to ultrasonic energy bonded four-layer sheet by urethane glue 22. Otherwise, if the first layer 12 contains less than 40% natural fibers, the entire five layers can be bonded together by ultrasonic energy either one layer at a time or simultaneously.

Modifications of the fabric 10 include the following:

(1) The second layer 14 or the fourth layer 18 or both layers can as an option contain antimicrobial fibers as a biocide and mildewcide as disclosed by U.S. Pat. No. 5,565,265.

(2) The fourth layer 18 can also be a needle punch soaker batting as the second layer 14 containing rayon fibers, cotton fibers, polyester fibers, and mixtures thereof.

(3) The fourth layer 18 and the fifth layer 20 can be combined, but omitting any absorbent fibers such as rayon and cotton to continue to act as a protective layer when washing the blanket.

Another advantage of this fabric is the prevention of perspiration by the infant while lying on the cover due to the breathability property inherent in this fabric.

The prevalent utilization of foam mattress pads today creates the problem that the pads are not washable and become contaminated and odorous. Therefore, a washable foam pad cover which is breathable and waterproof would also prevent the foam pads from absorbing body fluids and becoming contaminated. The sheet when used as a mattress covering need not be completely made from the present fabric with the sides being a cotton fabric and the like.

It is to be understood that the present invention is not limited to the embodiments described above, but encompasses any and all embodiments within the scope of the following claims.

I claim:

1. A waterproof five-ply fabric composition comprising:

a first top layer of a fabric selected from the group consisting of polyester, cotton, and polyester cotton blends;

a second contiguous layer, said second layer being a needle punch soaker or high loft batting soaker comprising a material selected from the group consisting of rayon fibers, cotton fibers, polyester fibers, and mixtures thereof, said fibers being needle punched into a nonwoven polyester or polypropylene scrim or batting material;

a third contiguous breathable, waterproof layer;

a fourth contiguous layer, said fourth layer being a batting or a needle punch material with needle punched fibers selected from the group consisting of rayon, cotton, polyester, and mixtures thereof;

a fifth contiguous layer made of a fabric material selected from the group consisting of polyester, nylon and acrylic; and each of said contiguous first, second, third, fourth, and fifth layers being laminated across a surface of same to the next contiguous layer to form a waterproof, breathable, washable fabric composite.

2. The fabric composition according to claim 1, said second and/or fourth layers having antimicrobial fibers.

3. The fabric composition according to claim 1, said first top layer having polyester fibers.

4. The fabric composition according to claim 1, said first top layer having greater than 40% cotton fibers and being bonded to said second contiguous layer by a water-based urethane glue.

5. The fabric composition according to claim 1, said first top layer having a blend of polyester and cotton fibers.

6. The fabric composition according to claim 1, said second layer having rayon fibers.

7. The fabric composition according to claim 1, said second layer having cotton fibers.

8. The fabric composition according to claim 1, said second layer having polyester fibers.

9. The fabric composition according to claim 1, said second layer having a mixture of rayon fibers, cotton fibers and polyester fibers.

10. The fabric composition according to claim 1, wherein said third layer is polyester.

11. The fabric composition according to claim 1, wherein said third layer is acrylic.

12. The fabric composition according to claim 1, wherein said fourth layer is needle punch batting.

13. The fabric composition according to claim 1, wherein said fourth layer is high loft batting.

14. The fabric composition according to claim 1, wherein said fourth layer having polyester fibers punched into said batting or needle punch material.

15. The fabric composition according to claim 1, said fourth layer having rayon fibers needle punched into said needle punch material.

16. The fabric composition according to claim 14, said fourth layer having cotton and polyester fibers needle punched into said needle punch material.

17. The fabric composition according to claim 14, said fourth layer having a mixture of rayon fibers, polyester fibers and cotton fibers needle punched into said needle punch material.

18. A five layer composite fabric comprising:
a) a first outer layer of a woven or knit fabric;
b) a second contiguous layer of a non-woven soaker web, said second layer being bonded across one side thereof to said first layer;
c) a third contiguous layer of a waterproof, breathable film, one side of said film being bonded across said side to a side of said non-woven layer opposite said first outer layer;
d) a fourth contiguous layer of a non-woven web, a surface of said non-woven web being bonded thereacross to a side of said waterproof, breathable film opposite said second layer; and
e) a fifth contiguous layer of a woven or knit fabric bonded across said fabric to a side of said fourth layer opposite said film, said fabric being characterized by an ability to wick body fluids away from a surface of same adjacent a person and absorb same while being waterproof and breathable.

19. A multilayer composite fabric comprising:
a) a first top outer layer of a textile fabric;
b) a second contiguous layer of a non-woven soaker web, said web being bonded to a side of said first layer across said layers;
c) a third contiguous layer of a waterproof, breathable film, one side of said film being bonded thereacross to an adjacent surface of said non-woven web; and
d) a fourth bottom layer of a non-woven web, said fourth layer being bonded thereacross to an adjacent surface of said film, said fabric being characterized by an ability to wick body fluids away from a surface of same adjacent a person while being waterproof and breathable.

* * * * *